May 7, 1968  A. MARZOCCHI  3,382,302
METHOD FOR THE MANUFACTURE OF REINFORCED PLASTIC FOAMS
Original Filed Aug. 13, 1957
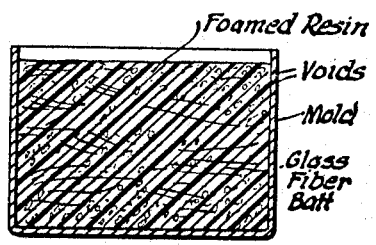
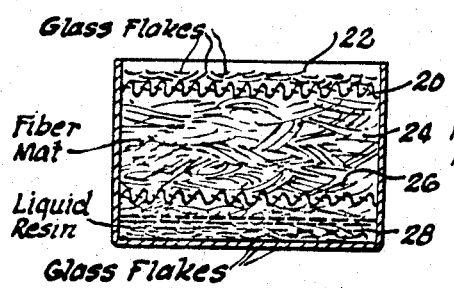
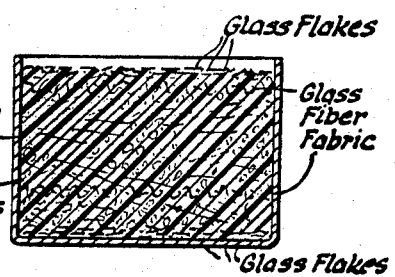
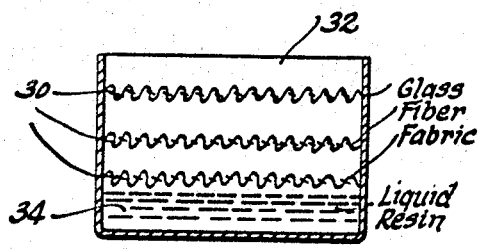
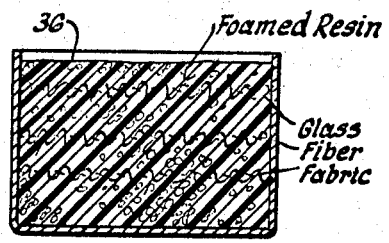
INVENTOR.
Alfred Marzocchi
BY
Staelin & Overman
Attorneys

United States Patent Office 3,382,302
Patented May 7, 1968

3,382,302
METHOD FOR THE MANUFACTURE OF REINFORCED PLASTIC FOAMS
Alfred Marzocchi, Cumberland, R.I., assignor to Owens-Corning Fiberglas Corporation, a corporation of Delaware
Continuation of application Ser. No. 291,689, July 1, 1963, which is a continuation of application Ser. No. 677,978, Aug. 13, 1957, which in turn is a continuation-in-part of application Ser. No. 639,027, Feb. 8, 1957. This application July 13, 1966, Ser. No. 564,929
12 Claims. (Cl. 264—45)

ABSTRACT OF THE DISCLOSURE

The production of a cellular polyurethane resinous product reinforced with glass fibers in which the glass fiber component is pre-arranged in the mold cavity in the position desired for reinforcement of the cellulated polyurethane product after which the foamable liquid polyurethane resin is introduced into the mold space in an amount to fill the space when foamed and then causing the polyurethane resin to foam while being advanced to a set stage whereby the foam fills the mold space and encompasses the glass fiber component in the desired pre-arrangement as a reinforcement in the cellulated polyurethane-glass fiber product.

---

This application is a continuation of my application Ser. No. 291,689, filed July 1, 1963, entitled "Reinforced Plastic Foams and Method for the Manufacture of Same" and now abandoned, which was a continuation of my then copending application Ser. No. 677,978, filed Aug. 13, 1957, and now abandoned, which was a continuation-in-part of my application Ser. No. 639,027, filed Feb. 8, 1957, and now abandoned.

This invention relates to a new and improved method for the manufacture of a structure formed of glass fibers or flakes, and it relates more particularly to a foamed resinous-glass fiber or flake combination wherein the glass fibers or flakes are uniformly distributed or otherwise arranged in a predetermined pattern throughout the foamed resinous structure to produce products characterized by one or more of the properties including low specific gravity, good thermal stability, good electrical resistance, high strength, good resiliency and the like properties adapted for use as cushioning, thermal or sound insulation, structural panels and the like.

In the aforementioned copending application, description is made of the manufacture of foamed resin-glass fibers or flake combinations wherein the glass fiber or flake is uniformly distributed throughout the body of resinous material prior to foaming in the formation of the final product. When so incorporated, the amount of glass component capable of being embodied into the system constitutes a relatively small fraction of the final product when calculated on a weight or volumetric basis, because only a limited amount of the glass component is capable of admixture with the resinous material before the viscosity is increased beyond the point of workability or flow, and because the continuity of the resinous material is disturbed by excessive amounts of fiber. Thus, as described in the aforementioned application, the amount of glass component in the final foamed product seldom exceeds 12% by weight, while 20% by weight appears to be the practical upper limit.

It is an object of this invention to provide an additional means for the combination of glass fibers and flakes with foamed synthetic resinous materials, and it is a related object to provide a method wherein the fiber or flake concentration in the final product is not limited to a maximum of 20%.

More specifically, it is an object of this invention to produce and to provide a method for producing foamed resin-glass combinations of the types described in which the glass concentration can range from 1 up to 90% by weight of the final product; wherein the glass fiber component can be uniformly distributed substantially throughout the foamed structure or otherwise contained in the structure in a predetermined arrangement to impart directional strength, improved appearance, or desired color combinations or other effects, and it is a related object to provide a simple and efficient means for the combination of foamed resin and glass in the form of flakes and fibers to produce new and novel structures of exceptional quality and characteristics; which enables the production of products of various designs and shapes; which enables fabrication in combination with the additional elements to be united as a composite thereof; which enables fabrication either at ambient or elevated temperature thereby to enable the use of low cost and readily available molds and materials, and which offers a clean and rapid means for manufacture thereby to tie up a minimum amount of equipment, space and materials.

These and other objects and advantages of this invention will hereinafter appear and for purposes of illustration, but not of limitation, an embodiment of the invention is shown in the accompanying drawing, in which—

FIGURE 1 is a schematic view in sectional elevation of a step in the manufacture of a product embodying the features of this invention;

FIGURE 1a is a sectional elevational view similar to that of FIGURE 1 showing the completed product; and FIGURES 2 and 2a and FIGURES 3 and 3a are similar to FIGURES 1 and 1a showing a modification in the arrangement of elements to produce a modified product.

The concepts of this invention reside in the fabrication of systems of foamed resin and glass by prearrangement of the glass component in the form of fibers or flakes in the position desired in the final product, followed by foaming of the resinous material within the spaces between and about the fibers to incorporate the glass components in the foamed resinous structure and as a composite part thereof. This is to be distinguished from the system described and claimed in my aforementioned copending application wherein the glass component is incorporated directly into the fluid resinous material for displacement therewith during flow in the foaming and curing step.

By prearrangement of the glass component in the position desired in the foamed resinous product, it becomes possible to make use of a low concentration of fibers or flakes, such as in the order of 1% by weight of the final product. Likewise, it is possible to make use of a high concentration of fibers or flakes packed together to provide lesser space in between so that lesser amounts of the foamed resinous material will be required to fill the spaces in and about the glass components whereby the glass component can represent as much as 90% by weight of the final foamed resinous product. Usually, the amount of glass will lie somewhat in between the minimum and maximum, preferably within the range of from 10–40% by weight of the final product.

By the concepts described, it becomes possible to prearrange the fiber in the structure for directional strength to incorporate such strength characteristics in the final product. For this purpose, the glass fibers or flakes can be arranged to lie somewhat within a predetermined plane or to extend in one or more predetermined directions, whereby the arrangement will be maintained in the final foamed product to provide directional strength. By the same token, fibers of different colors can be arranged in different layers or in different patterns within layers, or combinations thereof, to give various color combinations for enhancing the appearance or the decorative effect of the foamed product or for other useful purpose.

By way of still further flexibilities in construction and operation, elements to be incorporated or otherwise tied into the foamed plastic can be positioned in advance with the glass component in the space to be occupied by the resinous material upon foaming to incorporate such other elements or element into the final product incidental to the flow of the resinous material to fill the space throughout upon foaming to cure.

In the preferred concept of this invention, use is made of a glass component in the form of fibers. Such fibers can be in the form of batts or mats of discontinuous fibers or bound batts or mats of discontinuous or continuous fibers. Such batts or mats can be provided in various densities ranging from 1 lb. per cubic foot to about 60 lbs. per cubic foot with the spaces available between and about the fibers varying inversely with the density. When it is desired to make use of a high concentration of glass in the foamed structure, mats or batts of higher density can be employed. In the alternative, the mats or batts can be placed under pressure to compress the fibrous structure with corresponding reduction in space available to be filled by the foamed resinous material, thereby to increase the fiber concentration in the final product. Use can be made of fabrics of woven, knitted, or bonded glass fibers or combinations thereof with mats or batts of the types previously described. For example, when high strength in the surfaces of the foamed plastic should be desired, the mats or batts can be used as the core faced with fabrics of continuous or discontinuous fibers. Instead, use can be made of fabrics of unidirectional fibers to provide directional strength in the foamed plastic product. Where a mat, batt or fabric is employed, use can be made of one or more layers of non-woven glass fibers laid down in random arrangement, or in a predetermined linear or swirl pattern for directional strengths. Similarly, such glass system can incorporate glass fibers as layers applied to the surfaces or between mats or batts of glass fibers to produce new and novel structures.

When use is made of such woven or non-woven fabrics, it is preferred to make use of such fabrics as a facing or as an interlayer with glass mats or batts to provide a reinforcing facing with the batts or mats serving as a core in between. Such woven and non-woven fabrics of glass fibers can be employed separate and apart from mats or batts of glass fibers. Under such circumstances, the fabrics may be plied one on the other to occupy the space subsequently to be filled by the foamed resinous material, or the fabrics may be prearranged in a predetermined spaced relation intended to be occupied in the final product, with means being provided for maintaining the fabrics in such positions while the resin is being advanced to cure with the desired foaming.

The glass system of predetermined concentration and construction or arrangement can be provided in open space for combination with the resinous material, or the glass component can be confined within a mold space or the like for integration with the foamed resin to produce a foamed product of predetermined shape and dimension. Similarly, the glass fiber or flake components may be supplied in endless lengths for combination with the resinous material in a continuous operation for foaming to cure, thereby to achieve mass production of a product of uniform characteristics in a lengthwise and crosswise direction for subsequent processing or machining to structural shapes.

As the foamable resin employed in the combination with the glass elements, it is preferred to make use of polyurethanes because of the availability of the resinous component preferentially to wet out the surfaces of the glass fibers as distinguished from the lesser ability to wet out, with resulting lower bond, with other resinous materials, especially those formed by addition polymerization as distinguished from condensation polymerization. In order to improve the wet out characteristics and to increase the bonding relationship between the glass component and the foamed resinous materials, the glass fibers or flakes can be precoated with an anchoring agent, as will hereinafter be described, to promote adhesion between the resinous material and the glass fiber surfaces. When such anchoring agents are employed either as a coating on the glass components or as a component in the resinous material, the differences as between resins is not so noticeable. Thus, any of the resinous materials defined in the aforementioned copending application can be employed.

When the glass system is processed to the concentration and arrangement desired, liquid resinous component in an amount sufficient to fill the interstices between the glass when foamed is incorporated into the fibrous system or into the confined space when the glass components are arranged within a mold space. Upon foaming, the resinous material expands in volume and flows between the fibers or flakes to fill the spaces between and about the fibers or flakes, as by an impregnation process, to integrate the fibers or flakes with the foamed resinous material into a cured composite product.

When the volume of the open spaces between the fibers is limited because of the high concentration of the glass component, then the amount of resinous material required to fill the spaces upon foaming will be less thereby to enable a high concentration of glass to be built up in a predetermined arrangement within an integrated foamed resinous structure. In this way, it is possible to produce a foamed product containing as much as 90% by weight of glass and only 10% by weight of a foamed resinous material and still have a porous structure with better than 60–80% by weight voids.

In a process of the type described, it becomes possible, for the first time, to make use of a resinous component that cures to a hard or brittle stage to produce rigid porous structures or insulation products. It becomes possible also to make use of resinous binder components that set to a soft and resilient state to produce cushioning material having good strength, good thermal insulating characteristics and the like. Thus, by selection of the glass fiber or flake component and by the selection of the arrangement and concentration of the glass components, and by the selection of resinous binder foamed in combination therewith, it becomes possible to produce a wide variety of products having widely varying characteristics—products incapable heretofore of being produced by systems previously employed.

Having broadly defined the concepts of this invention, illustration will now be made of specific practices in the fabrication of such new and novel products.

With reference the FIGURES 1 and 1a, a mold space 10 is filled with a mat 12 of unbonded, discontinuous glass fibers 14. A liquid polyester-isocyanate polyurethane resin 16 in amounts to constitute about 40% by weight of the finished product (the remainder being the glass component) is introduced into the mold space 10. Much of the resin may flow to the bottom of the mold to form a layer 18 therein. The materials are heated to a temperature of 250–300° F. to cause the resinous material to be advanced to a cured state while being foamed by the carbon dioxide and moisture released as a vapor which becomes entrapped in the curing resin. The entrapped vapors cause the resin to increase in volume, whereby the resin expands to occupy the spaces between and about the fibers, as illustrated in FIGURE 1a, while the fibers remain in position to become entrapped within the foamed, porous resinous matrix. Instead of making use of heat to cause advancement and foaming of the resin, the described reactions may be achieved by triggering the resinous material with a catalyst, or use can be made of combinations of catalysts and heat to achieve the desired result.

In FIGURES 2 and 2a, illustration is made of the combination which makes use of a glass fiber fabric 20 for directional strength and reinforcement of the surface portions of the end product and for imparting flexure, strength and flexibility to the product. Illustration is also included of the use of glass flakes 22 as a component concentrated to form a surface layer in providing improved appearance and surface finish to the final product or to provide a barrier to the infiltration of certain materials. The core of the structure is composed of an open bath of discontinuous fibers 24.

In fabrication, the glass components are built up in the desired arrangement in the mold space 26. A polyester-diisocyanate resin 28 in an uncured and liquid state is introduced into the mold space in an amount to fill the mold space when foamed. Preferably, an amount of resinous material corresponding to 60–80% by weight of the final product is introduced to provide a product containing from 20–40% by weight of glass fibers. The materials are heated to a temperature of from 250–350° F. for advancement of the resinous material to a cured state and for foaming. As the carbon dioxide and the vapors released by condensation or from added moisture are generated, the gases become entrapped within the viscous resinous body to cause foaming which expands the resin by amounts to fill the mold space. Thus the resin flows between and about the fibers and flakes to integrate the fibers and flakes into a composite structure having a continuous matrix of a foamed resinous material, as illustrated in FIGURE 2a.

In FIGURES 3 and 3a, illustration is made of a modified concept wherein glass fibers in fabric form are embodied in a matrix of a foamed resin. For this purpose, the fabrics 30 of glass fibers are stretched across the mold space 32 and held in the position desired to be maintained in the foamed plastic product. Various means may be employed for anchoring the fabrics at their edges to maintain the fabrics in the desired position. The resin 34 may be introduced into the mold space prior to the arrangement of the fabrics or afterwards. An amount of resin is added with moisture to fill up the mold space when foamed. The resin is heated or otherwise catalyzed for reaction to advance the resinous material to a set stage with concurrent release of gases or vapors for foaming the resin. This causes the resinous body to expand and to flow between and about the fibers to fill the mold space with a porous body 36 in which the fabric or glass fibers is integrated.

The described structures can be removed from the molds after the resinous material has been set or cured. In the event that the structures have not been molded to shape incident to their formation, the formed bodies can subsequently be machined or molded to a desired shape or construction.

The foamable polyurethanes of the type employed in the practice of this invention by reaction of a polyester with an isocyanate are well known to the art such that no further description thereof need be made.

By way of a continuous process, packs of glass fibers in the form of endless mats or webs can be advanced through or over a liquid bath of the foamable resin triggered as by a catalyst to cause advancement with foaming, thereby to cause the foamed resinous material to flow through the pack and fill the interstices between the fibers to integrate the fibers into the system. A product similar to that shown in FIGURE 1a would be secured. Instead of advancing the pack over or through the bath of liquid resin, the liquid resinous component can be continuously introduced into the pack from above or otherwise in amounts to achieve the desired coverage of the space occupied by the pack. The resin introduced can be triggered with catalyst for cure with foaming or the desired reactions can be achieved by advancement of the materials through a heated section at a temperature sufficient to cause foaming with the resin. In the alternative, both heat and catalyst can be employed.

The packs of glass fibers can be supplied separate and apart from their formation, but it would be preferred to carry out the described fabrication in conjunction with the continuous formation of the packs in fiber manufacture. For this purpose, multiple streams of molten glass are caused to flow gravitationally between headers from which streams of high pressure steam or air are directed angularly downwardly onto the stream to cause their rapid attenuation into fibers. The fibers are rained down from above onto an endless belt forming the bottom wall of a collecting chamber, whereby the fibers interfelt to form a pack. The thickness of the pack can be varied by adjustment of the linear speed of the belt and the integrity of the pack can be enhanced by the application of a small amount of resinous binder. The resinous foam subsequently formed in the pack can function as a binder and as a protective agent for the fibers while the fibers in turn operate to reinforce the foamed resinous matrix. Systems of the type described for the fabrication of bonded or unbonded packs are more fully set forth in the following patents: Slayter et al., 2,206,058; Simpson, 2,230,271; Bergin, et al., 2,252,157; Slayter et al., 2,257,767; and Kleist, et al., 2,287,006.

A product of the type produced in accordance with the practice of this invention having the glass fibers distributed in the foam that is formed will be characterized by an increase in the strength properties at least 2 to 4 times greater than the strengths available of the foamed resinous material without the glass fiber component. It has been found further that the combination which makes use of glass in the form of fibers or flakes in the combination with a foamable resinous material tends to increase the amount of pores that are formed and uniformity of the pores that are formed in the resinous material, to the end that a porous product is secured having lower density and better resiliency than would have been available with the same resinous materials in the absence of the glass component. Still further, the glass components tend to decrease the cost of the foamed products while simultaneously increasing the stiffness or the compressive characteristics of the foamed products, thereby to make the materials more suitable for use either as insulation or as a cushioning material.

The amount of cellular structure or porosity that is formed in response to the presence of glass fibers or flakes appears to be in the order of 10–50% greater than the porsity formed under equivalent conditions, with the same materials but in the absence of the glass component. The increase in porosity or corresponding decrease in density, responsive to the presence of the glass fibers or flakes, is believed to be somewhat contrary to the reactions ordinarily expected and somewhat unlike the reactions secured by other materials which might ordinarily be considered equivalents of glass fibers. The foregoing might offer some explanation for the improvement in compressive characteristics experienced with foams prepared in accordance with the teaching of this invention.

In the practice of this invention, use can be made of glass fibers or flakes having a size on the surfaces thereof such as may be formulated of dextrinized starch and incompatible oils. Use can also be made of glass fibers and flakes having an anchoring agent on the surfaces thereof to enhance the wetability of the fibers by the resinous materials and to improve the bonding relationship between the resinous materials and the glass fiber surfaces, especially when the latter comprises a substance which does not wet out the glass fibers as readily as the described polyurethane resins. For this purpose, use can be made of an unsaturated organo-silicon compound in the form of a silane, polysiloxane, silanol or polysiloxanolate, such as described in the Steinman Patent No. 2,563,288. Use can be made of an unsaturated Werner complex compound as described in the Steinman Patent No. 2,552,910, or use can be made of a basic amine or cationic amine compound having an organic group attached to the basic nitrogen atom containing an unsaturated group or other functional group capable of strong attachment by reaction or orientation with groupings available in the resinous component.

Marked improvements in the properties and characteristics of products described are capable of development in the combination which makes use of glass fibers and flakes and the polyurethane polymers. These materials appear to embody elements for the development of properties incapable of development in an equivalent degree in other materials which might ordinarily be combined with foamed polyurethane, such as metal powders, fillers, pigments and the like. Ordinarily, glass fibers are less capable of combination to modify the characteristics of synthetic organic resinous materials and plastics or laminates formed thereof because the glass fibers or flakes are characterized as non-porous, solid structures having a perfectly smooth surface. As a result, resinous materials are incapable of employing physical forces for attachment to the glass fiber surfaces properly to integrate the glass components into the composite structure for maximum utilization of the desirable properties available from the glass materials. Unless a strong bonding relationship can be provided between the resinous component and the glass fibers, full utilization of the glass cannot be secured in the formed structure. This is especially true in the attempts to make use of the glass fibers as a reinforcement and strengthening agent for the resinous materials.

The combination between the synthetic polyurethane polymers and glass fibers or flakes appears to present an entirely different condition. The glass fibers or flakes are formed with a large number of free hydroxyl groups which are responsible ordinarily for imparting some of the hydrophilic characteristics to the glass fibers. Unexpectedly, however, these free hydroxyl groups on the glass surfaces appear to be capable of reaction, as by condensation with hydroxy or carboxy groups present in the polyisocyanate-polyester polyurethane resin-forming material, to the end that a combination is capable of development between the glass surfaces of the resin-forming material to form a strong bonding relationship therebetween.

The improved tie-in between the glass surfaces and the foamed polyisocyanate resins and the enhanced saturation of the glass fibers and flakes by the resinous component enables the fabrication of a low density product which not only provides many of the improvements described but which makes available a product that combines the most desirable characteristics of the foamed resin and the most desirable properties of the glass fibers or flakes.

It will be apparent from the foregoing that I have provided a new and novel product and a means for the manufacture of same, embodying a high concentration or a low concentration of glass fibers and flakes in a foamed plastic material. By the use of such glass components in combination with a foamed resinous material, it has been found possible to increase such properties as the strength properties of the foam, the rigidity of the foam, its compressive characteristics and the like, and to lower the density of the foams thereby to make foams available which are better adapted for use as insulations, cushioning and the like.

It will be understood that changes may be made in the details of formulation and in the steps of processing to produce the foamed product without departing from the spirit of the invention, especially as defined in the following claims.

I claim:

1. The method of producing a cellulated polyurethane-glass fibrous product comprising the steps of arranging the glass fibers separate and apart from the liquid polyurethane resin to the density and to the positions desired in the cellulated polyurethane-glass product, introducing in said separate and apart fashion a foamable liquid polyurethane resin for combination with glass fibers in an amount to fill the spaces and and about the glass fibers when foamed, causing the polyurethane component to foam while being advanced to a set stage whereby the foamed resin fills the spaces in and about the glass fibers without noticeable displacement of the fibers to integrate the glass fibers in the desired arrangements within the foamed structure to form a composite cellulated polyurethane-glass product.

2. The method as claimed in claim 1 in which the glass fibers are present in the form of a pack of discontinuous glass fibers heterogeneously arranged and having a high degree of freeness for flow of foamed resin therethrough.

3. The method as claimed in claim 1 in which the glass fibers include one or more layers of glass fibers arranged to extend in predetermined directions in the matrix of foamed polyurethane to impart directional strength.

4. The method as claimed in claim 1 in which the glass fibers include one or more layers of thin flakes of glass.

5. The method as calimed in claim 1 in which the glass fibers represent an endless pack of glass fibers and in which the liquid polyurethane is introduced continuously into the pack and subsequently processed for foaming during advancement to a set stage to provide a continuous process for manufacture.

6. The method as claimed in claim 5 in which one or more woven or non-woven fabrics of glass fibers are plied onto the surfaces of the pack for integration into the foamed polyurethane-glass structure by the foamed resinous component.

7. The method as claimed in claim 1 in which the polyurethane is heated to an elevated temperature to cause foaming.

8. The method as claimed in claim 1 in which the polyurethane is triggered for catalytic reaction to cause foaming.

9. The method as claimed in claim 1 in which the amount of glass fibers in the product ranges from 1–90% by weight of the product and in which the foamed polyurethane substantially makes up the remainder.

10. The method as claimed in claim 9 in which the glass fibers comprise 20–90% by weight of the product and the foamed polyurethane matrix the remainder.

11. The method as claimed in claim 1 wherein the glass fibers are prearranged within a confined space and wherein the polyurethane is introduced in an amount to fill the space when foamed.

12. The method as claimed in claim 11 which includes the additional step of removing the composite product from the confined space when the foamed polyurethane has set.

References Cited

UNITED STATES PATENTS

| | | | |
|---|---|---|---|
| 2,140,063 | 12/1938 | Talalay | 264—45 |
| 2,194,036 | 3/1940 | Talalay | 264—45 |
| 2,331,145 | 10/1943 | Slayter | 264—113 X |
| 2,543,101 | 2/1951 | Francis | 264—112 X |
| 2,802,766 | 8/1957 | Leverenz. | |
| 2,827,666 | 3/1958 | Wagner | 264—45 X |
| 2,855,021 | 10/1958 | Hoppe | 264—45 X |
| 2,866,497 | 12/1958 | Struthers. | |
| 2,895,603 | 7/1959 | Freeman. | |
| 2,972,554 | 2/1961 | Muskat et al. | 264—47 X |
| 3,024,701 | 3/1962 | Marks et al. | |

ALEXANDER H. BRODMERKEL, *Primary Examiner.*

P. E. ANDERSON, *Assistant Examiner.*